United States Patent [19]

Arnold et al.

[11] Patent Number: 4,562,076

[45] Date of Patent: Dec. 31, 1985

[54] CHEWING GUM WITH COATING OF THAUMATIN OR MONELLIN AND METHOD

[75] Inventors: Todd W. Arnold, White Pidgeon, Mich.; Mansukh M. Patel, Villa Park, Ill.

[73] Assignee: Wm. Wrigley Jr. Company, Chicago, Ill.

[21] Appl. No.: 556,092

[22] Filed: Dec. 1, 1983

Related U.S. Application Data

[63] Continuation-in-part of Ser. No. 453,274, Dec. 27, 1982, abandoned.

[51] Int. Cl.$^4$ ............................................. A23G 3/30
[52] U.S. Cl. ........................................ 426/5; 426/103
[58] Field of Search ........................................ 426/3–6, 426/548, 658, 103

[56] References Cited

U.S. PATENT DOCUMENTS

| | | |
|---|---|---|
| 2,305,960 | 12/1942 | Frorer . |
| 3,681,087 | 8/1972 | Johnson . |
| 3,780,189 | 12/1973 | Scott . |
| 3,878,184 | 4/1975 | Dobry . |
| 3,947,600 | 3/1976 | Rousseau . |
| 3,962,463 | 6/1976 | Witzel . |
| 4,122,205 | 10/1978 | Burge et al. . |
| 4,127,677 | 11/1978 | Fronczkowski et al. . |
| 4,228,198 | 10/1980 | Burge et al. . |
| 4,238,510 | 12/1980 | Cherukuri et al. . |
| 4,254,154 | 3/1981 | Eisenstadt . |
| 4,292,336 | 9/1981 | Latymer . |
| 4,300,576 | 11/1981 | van der Loo et al. . |
| 4,317,838 | 3/1982 | Cherukuri et al. . |
| 4,374,858 | 2/1983 | Glass et al. . |
| 4,385,071 | 5/1983 | Yakimischak . |
| 4,412,984 | 11/1983 | van der Loo et al. . |

FOREIGN PATENT DOCUMENTS

| | | |
|---|---|---|
| 0014554 | 8/1980 | European Pat. Off. . |
| 0027024 | 4/1981 | European Pat. Off. . |
| 2315862 | 1/1977 | France . |

*Primary Examiner*—Jeanette M. Hunter
*Attorney, Agent, or Firm*—Willian, Brinks, Olds, Hofer, Gilson & Lione Ltd.

[57] ABSTRACT

The application of thaumatin or monellin to the surface of a chewing gum composition comprising gum base, sweetener and flavoring provides flavor and sweetness potentiation. The thaumatin or monellin is present in an amount within the range of from about 0.5 to about 100 ppm by weight of the chewing gum composition and is conveniently applied as a rolling compound to the surface of the gum.

34 Claims, No Drawings

CHEWING GUM WITH COATING OF THAUMATIN OR MONELLIN AND METHOD

This application is a continuation-in-part of application Ser. No. 453,274, filed Dec. 27, 1982 now abandoned.

This invention relates in general to chewing gum compositions and, in particular, to gum compositions having a surface application of the proteinaceous materials thaumatin or monellin, which are high-potency flavor and sweetness enhancers.

As is well-known in the art, chewing gum generally comprises chewable gum base, flavoring and a sweetener contained in a water-soluble bulking agent. Plasticizing agents and coloring may also be included.

Efforts have been made to improve the sweetness and flavor characteristics of chewing gum by using artificial sweeteners which are non-cariogenic and non-toxic and which have desirable organoleptic qualities. For example, dipeptide sweetening agents, particularly aspartame, have been found to be excellent sugar substitutes which have these characteristics. However, such sweeteners are expensive and, when mixed into chewing gum base as they typically are, provide only a limited initial sweetness impact. Need has arisen for a method of enhancing the flavor and sweetness characteristics of chewing gum, particularly gum upon employing dipeptide sweeteners.

SUMMARY OF THE INVENTION

According to the present invention, the sweet proteins thaumatin and monellin, which are naturally-occurring, high-potency flavor and sweetness adjuvants, enhance the flavor and sweetness characteristics of chewing gum when the thaumatin or monellin is applied to the surface of the gum. The thaumatin or monellin also extends the sweetness of the gum.

Where the chewing gum employs a dipeptide sweetener such as aspartame, it has been found that the deposition of thaumatin or monellin potentiates the sweetness characteristics of the dipeptide to provide rapid initial sweetness impact and improved overall sweetness characteristics similar to those of a sucrose-sweetned gum, without any bitterness.

Since thaumatin or monellin are extremely potent flavor and sweetness adjuvants, only a small quantity of these sweet proteins, from about 0.5 to about 100 ppm by weight of the chewing gum composition, is required to achieve these effects. Where a dipeptide such as aspartame is used to sweeten the gum, such a small quantity of thaumatin or monellin applied to the gum surface potentiates the sweetness of the dipeptide and permits a substantial reduction in the amount of the dipeptide which otherwise would be required to sweeten the gum, resulting in significant cost savings. Used in such small quantities by itself, the thaumatin and monellin would provide a negligible amount of sweetness to the gum; however, in the present invention the thaumatin or monellin is employed as an adjuvant to potentiate the flavor and sweetness characteristics of the gum, particularly the initial sweetness impact.

According to a further aspect of the present invention, the deposition of thaumatin or monellin is conveniently applied as a rolling compound onto the surface of the gum composition.

DESCRIPTION OF THE INVENTION

The high-potency sweetener thaumatin is a proteinaceous substance obtained from the fruit of the tropical plant *Thaumatoccoccus daniellii*, which grows in tropical Africa. The sweetness of thaumatin is about 2,000 to 3,000 times that of sucrose on a weight basis, making it one of the sweetest known substances. Thaumatin also has a lingering sweet after-taste. Monellin, also a natural high-potency sweetener, is a protein having characteristics similar to thaumatin. Monellin is obtained from the fruit of the tropical plant *Dioscoreophyllum cumminsii*.

According to the present invention, a chewing gum composition having a core portion preferably comprising gum base, sweetener and flavoring is sweetened by applying or depositing thaumatin or monellin onto the surface of the gum core portion in an amount within the range of from about 0.5 to about 100 ppm, preferably from about 3 to about 20 ppm, by weight of the chewing gum composition. If the thaumatin or monellin were incorporated into the gum mass rather than applied to the gum surface, about 200 to 300 ppm would be required to obtain flavor and sweetness potentiation equivalent to that achieved by the surface deposition of thaumatin or monellin according to the present invention.

The chewing gum composition may comprise a core portion having a chewable gum base and flavoring, with thaumatin or monellin being deposited on the surface of the core portion. A high-potency sweetener (that is, one having a sweetness greater than twenty times that of sucrose) may be contained in the core portion or applied to the surface of the core portion.

The chewing gum base comprises any chewable and substantially water-insoluble base in an amount ranging from approximately 18% to 50%, but preferably 25%, by weight of the total chewing gum composition. The gum base may contain a calcium carbonate or the talc filler, but the calcium carbonate base has better chewing characteristics and is less expensive than the talc base.

The sweetener in the chewing gum composition of the present invention can be a water-soluble bulking agent present in an amount ranging from about 30% to about 65% by weight of the entire chewing gum composition. For sugar gums, the sweetener may be dextrose, sucrose, maltose, dextrin, dried invert sugar, fructose, levulose, galactose or corn syrup solids, or combinations thereof. For sugarless gums, the sweetener may be a sugar alcohol such as sorbitol, mannitol or xylithol; or it may comprise a high-potency sweetener as previously defined. The preferred sweetener for sugarless gums is the dipeptide sweetener aspartame (L-aspartyl-L-phenylalanine methyl ester, originally disclosed in U.S. Pat. Nos. 3,492,131 and 3,642,491) in an amount of about 0.025% to about 2.0%, but preferably about 0.1%, by weight of the chewing gum composition.

The chewing gum also comprises a known flavor such as an essential oil or synthetic flavor in an amount determined by preference, but generally about 1% of the chewing gum composition.

The chewing gum typically comprises a plasticizing agent in an amount of about 0.5% to about 7.5% by weight of the chewing gum composition; it optionally comprises a coloring agent in a conventional amount of about 0.01% to about 1% by weight of the gum composition.

The chewing gum is manufactured in a conventional manner. First, the base is heated and placed in a mixer.

If coloring is desired, it may be added at this point, followed by the sweetener, the plasticizing agent and flavor. When the chewing gum is removed from the mixer, the mixture is rolled in conventional product-forming equipment, as is well-known in the art.

The deposition of thaumatin or monellin onto the surface of the chewing gum is preferably accomplished by the application of a rolling compound to the chewing gum core portion. The rolling compound comprises thaumatin or monellin in combination with mannitol, sorbitol, sucrose, starch, calcium carbonate, talc, other orally acceptable substances, or a combination thereof. The rolling compound constitutes from about 0.25% to about 10.0%, but preferably about 1% to about 3%, by weight of the chewing gum composition. The rolling compound containing the thaumatin or monellin is preferably applied to the surface of the chewing gum using a well-known dusting procedure immediately prior to rolling the gum in the product-forming equipment in order to prevent adhesion of the gum and the rollers, particularly when the gum is warm.

As an alternative to applying the thaumatin or monellin as a rolling compound, the thaumatin or monellin may be deposited onto the surface of the chewing gum using a powder spray process. In such a process, which is known in the art, a powder is suspended in a pressurized gas which is sprayed onto a surface. Using such a technique, the rate of application of thaumatin or monellin to the chewing gum surface can be controlled by regulating the pressure of the gas, the amount of thaumatin or monellin suspended in the gas and the rate of travel of the chewing gum under the spray.

The thaumatin or monellin may also be applied to the surface of the chewing gum in a solution which is sprayed onto the gum. In such a process, which is also known in the art, an aqueous solution is formed and then sprayed as an aerosol mist. The thaumatin or monellin may also be applied by a process of electrostatic deposition in which particles of thaumatin or monellin are first charged and then sprayed onto chewing gum having an oppositely charged surface.

Thaumatin and monellin are substances of very low density and, because of their potency, can generate a nuisance dust. In order to facilitate handling of the thaumatin or monellin, they can be co-dried, using the well-known techniques of spray during or freeze drying with a food-grade carrier, which is preferably a carbohydrate (such as a natural carbohydrate gum, a dextrin or a starch), a sugar alcohol (such as mannitol or sorbitol) or a protein. The co-dried thaumatin or monellin is applied to the surface of the chewing gum as a spray or a rolling compound as previously described.

EXAMPLE I

A sugarless chewing gum containing aspartame can be manufactured according to the following formulation:

| Ingredient | Percent By Weight |
| --- | --- |
| Gum Base | 24.5 |
| Sorbitol Powder | 45.1 |
| 70% Sorbitol Solution | 12.6 |
| Mannitol Powder | 8.0 |
| Flavor | 1.13 |
| Glycerine | 6.5 |
| Color | 0.03 |
| Aspartame | 0.14 |
| Thaumatin Rolling Compound | 2.0 |

The rolling compound consists of mannitol and thaumatin, the thaumatin comprising 0.05% by weight of the rolling compound. The total thaumatin content is 10 ppm by weight of the chewing gum composition.

The small amount of surface-applied thaumatin exhibits a synergistic effect with the aspartame and permits a substantial reduction in the amount of aspartame which otherwise would be required to sweeten the gum. Assuming that thaumatin is about 2,500 times as sweet as sucrose, the 10 ppm of thaumatin used in this Example provides a sweetness potency equivalent to only about 2.5% sucrose, a negligible amount of sweetness. However, without this small quantity of surface-applied thaumatin, 0.22% aspartame would be required to achieve equivalent sweetness. Thus, the surface-applied thaumatin permits a reduction in the amount of aspartame from 0.22 to 0.14%, a 36% reduction. Assuming that aspartame is about 200 times as sweet as sucrose, this aspartame reduction is equivalent to about 16% sucrose, a relatively substantial amount.

EXAMPLE II

A sugar gum can be manufactured according to the following formulation:

| Ingredient | Percent By Weight |
| --- | --- |
| Gum Base | 20.19 |
| Corn Syrup | 13.33 |
| Sugar | 53.94 |
| Glycerine | 0.76 |
| Flavor | 0.87 |
| Dextrose Monohydrate | 9.91 |
| Thaumatin Rolling Compound | 1.0 |

The rolling compound consists of sugar and thaumatin, the thaumatin comprising 0.05% by weight of the rolling compound. The total thaumatin content is 5 ppm by weight of the chewing gum composition.

Although the present invention has been described in connection with specific embodiments, it will be recognized that numerous modifications both in the selection of the gum ingredients and in their amounts may be made without departing from the scope of the invention.

The embodiments of the invention in which an exclusive property or privilege is claimed are defined as follows:

1. A chewing gum composition having a core portion comprising chewable gum base, sweetener and flavoring, and further having deposited on the surface of said the core portion, a rolling compound comprising a sweet protein selected from the group consisting of thaumatin and monellin, the protein constituting at least 0.5 but less than 100 ppm by weight of the chewing gum composition.

2. The chewing gum composition of claim 1 wherein the protein is thaumatin.

3. The chewing gum composition of claim 1 wherein the protein is monellin.

4. The chewing gum composition of claim 1 wherein the protein constitutes from about 3 to about 20 ppm by weight of the chewing gum composition.

5. The chewing gum composition of claim 1 wherein the rolling compound constitutes from about 0.25% to about 10.0% by weight of the chewing gum composition.

6. The chewing gum composition of claim 1 wherein the rolling compound constitutes from about 1.0% to about 3.0% by weight of the chewing gum composition.

7. The chewing gum composition of claim 1 wherein the sweetener in the core portion comprises a high-potency sweetener.

8. The chewing gum composition of claim 1 wherein the sweetener in the core portion comprises a dipeptide sweetener.

9. The chewing gum composition of claim 1 wherein the sweetener in the core portion comprises aspartame in an amoung ranging from about 0.025% to about 2.0% by weight of the chewing gum composition.

10. The chewing gum composition of claim 9 wherein the protein constitutes from about 3 to about 20 ppm and the aspartame constitutes about 0.1% by weight of the chewing gum composition.

11. The chewing gum composition of claim 9 wherein the protein is thaumatin.

12. The chewing gum composition of claim 9 wherein the rolling compound constitutes from about 0.25% to about 10.0% by weight of the chewing gum composition.

13. The chewing gum composition of claim 9 wherein the rolling compound constitutes from about 1.0% to about 3.0% by weight of the chewing gum composition.

14. A chewing gum composition having a core portion comprising chewable gum base and flavoring and further having deposited on the surface of the core portion, a rolling compound comprising a protein selected from the group consisting of thaumatin and monellin, the protein constituting at least 0.5 but less than 100 ppm by weight of the chewing gum composition.

15. The chewing gum composition of claim 14 wherein the composition further comprises a high-potency sweetener.

16. The chewing gum composition of claim 15 wherein the high-potency sweetener is a dipeptide sweetener.

17. The chewing gum composition of claim 15 wherein the dipeptide sweetener is aspartame.

18. The chewing gum composition of claim 15 wherein the high-potency sweetener is applied to the surface of the core portion.

19. The chewing gum composition of claim 14 wherein the rolling compound constitutes from about 0.25% to about 10.0% by weight of the chewing gum composition.

20. A method of sweetening a chewing gum composition comprising chewable gum base and flavoring, the method comprising the step of applying to the surface of the gum composition a rolling compound comprising a sweet protein selected from the group consisting of thaumatin and monellin in an amount greater than 0.5 but less than 100 ppm by weight of the chewing gum composition.

21. The method of claim 20 wherein the chewing gum composition further comprises a sweetener.

22. The method of claim 20 wherein the protein is thaumatin.

23. The method of claim 20 wherein the protein is monellin.

24. The method of claim 20 wherein the rolling compound constitutes from about 0.25% to about 10% by weight of the chewing gum composition.

25. The method of claim 20 wherein the rolling compound is dusted onto the surface of the chewing gum composition.

26. The method of claim 20 and the additional step of co-drying the protein with a food-grade carrier prior to application of the protein to the surface of the gum composition.

27. The method of claim 26 wherein the carrier is a carbohydrate.

28. The method of claim 26 wherein the carrier is a sugar alcohol.

29. The method of claim 26 wherein the carrier is a protein.

30. The method of claim 26 and the additional step of spraying the protein onto the surface of the gum composition.

31. The method of claim 26 wherein the rolling compound constitutes from about 0.25% to about 10% by weight of the chewing gum composition, and wherein the rolling compound is dusted onto the surface of the chewing gum composition.

32. The method of claim 20 and the additional steps of preparing a solution of the protein and spraying the solution onto the gum composition.

33. The method of claim 20 wherein the protein constitutes from about 3 to about 20 ppm by weight of the chewing gum composition.

34. The method of claim 20 wherein the chewing gum composition comprises aspartame in an amount ranging from about 0.025% to about 2.0% by weight of the chewing gum composition.

* * * * *